United States Patent
Hiramatsu et al.

(10) Patent No.: US 11,898,478 B2
(45) Date of Patent: Feb. 13, 2024

(54) EXHAUST PIPE

(71) Applicant: FUTABA INDUSTRIAL CO., LTD., Okazaki (JP)

(72) Inventors: Yusuke Hiramatsu, Okazaki (JP); Shigeru Ogawa, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 24 days.

(21) Appl. No.: 17/748,244

(22) Filed: May 19, 2022

(65) Prior Publication Data
US 2022/0381175 A1 Dec. 1, 2022

(30) Foreign Application Priority Data
May 26, 2021 (JP) .................................. 2021-088421

(51) Int. Cl.
*F16L 23/036* (2006.01)
*F16L 23/16* (2006.01)
*F01N 13/18* (2010.01)

(52) U.S. Cl.
CPC ........ *F01N 13/1805* (2013.01); *F16L 23/036* (2013.01); *F16L 23/16* (2013.01)

(58) Field of Classification Search
CPC ......... F16L 23/036; F16L 23/16; F16L 23/04; F16L 23/08; F16L 23/20; F16L 58/187; F01N 13/1805
USPC .................................................. 285/365, 407
See application file for complete search history.

(56) References Cited

U.S. PATENT DOCUMENTS

| | | | |
|---|---|---|---|
| 3,632,143 A * | 1/1972 | Lessmann | |
| 5,076,617 A * | 12/1991 | Bronnert | F16L 23/18 |
| 5,573,282 A * | 11/1996 | Egner | F16L 58/187 |
| 5,876,070 A * | 3/1999 | McNealy | F16L 58/187 |
| 6,439,619 B1 * | 8/2002 | Storage | F16L 23/04 |
| | | | 285/365 |
| 2004/0094898 A1 * | 5/2004 | Zheng | F16L 23/20 |
| 2004/0189006 A1 * | 9/2004 | Jurena | F16L 23/20 |
| 2008/0136117 A1 * | 6/2008 | Roe | F16L 23/08 |

(Continued)

FOREIGN PATENT DOCUMENTS

| | | | |
|---|---|---|---|
| EP | 2832984 A1 * | 2/2015 | ............ F16L 23/20 |
| JP | H08260951 A | 10/1996 | |

(Continued)

OTHER PUBLICATIONS

Notice of Reasons for Refusal for Japanese Patent Application No. 2021088421, dated May 30, 2023, 10 pages.

*Primary Examiner* — William S. Choi
(74) *Attorney, Agent, or Firm* — Withrow & Terranova, P.L.L.C.; Vincent K. Gustafson

(57) ABSTRACT

An exhaust pipe forming a flow path of exhaust gas of a vehicle includes a first end including a first opening, a first flange portion formed on the first end, and a cover member. The first flange portion is configured to be fastened to a second flange portion formed on a second end of another exhaust pipe. The cover member includes a held portion and an inner circumferential portion. The held portion is held between the first end and the second end when the first flange portion and the second flange portion are fastened together. The inner circumferential portion covers a region adjacent to the first opening in the inner circumferential surface of the exhaust pipe.

18 Claims, 4 Drawing Sheets

(56) References Cited

U.S. PATENT DOCUMENTS

| | | | |
|---|---|---|---|
| 2009/0295155 A1* | 12/2009 | Keller-Staub | F16L 23/036 |
| | | | 285/365 |
| 2010/0083482 A1* | 4/2010 | Wirth | F01N 13/1805 |
| 2018/0100427 A1 | 4/2018 | Tsukiyama et al. | |

FOREIGN PATENT DOCUMENTS

| | | |
|---|---|---|
| JP | 3700977 B2 | 9/2005 |
| JP | 2015063945 A | 4/2015 |
| JP | 2018059461 A | 4/2018 |
| WO | 2012127531 A1 | 9/2012 |

* cited by examiner

EXHAUST PIPE

CROSS-REFERENCE TO RELATED APPLICATIONS

This application claims the benefit of priority based on Japanese patent application No. 2021-088421 filed on May 26, 2021 with the Japan Patent Office, and the entire disclosure of which is incorporated herein by reference.

BACKGROUND

The present disclosure relates to an exhaust pipe.

Components used in a supercharger and the like of a vehicle engine are exposed to exhaust gas of high temperature, and thus, required to have resistance to oxidation at high temperatures. These components are also repeatedly heated and cooled, and thus, required to have resistance to repeated oxidation. In addition, in recent years, there has been a tendency that the temperature of the exhaust gas becomes higher to comply with stricter exhaust gas regulations, and thus, there will be a growing demand for these components to be more resistant to a high temperature environment in the future.

In particular, the exhaust gas is easily deflected on a downstream side of the supercharger. Therefore, as described in JP 2018-59461A, a part of the exhaust pipe fastened with a v-band clamp on the downstream side of the supercharger may be locally damaged by heat of the deflected exhaust gas.

SUMMARY

To cope with this, changes of materials of the components have been conventionally considered in order to improve the resistance to the high temperature environment. However, the use of a material having high heat resistance may cause difficulty in shape processing or welding, and may lead to a cost increase.

In particular, a flange of the exhaust pipe fastened with the above-described v-band clamp has a special shape, and the shape is processed only by a limited way. Thus, if the way of processing the shape of the flange is further limited due to the change in materials of the exhaust pipe, the production of the exhaust pipe may become very difficult.

In some cases, it may be difficult to partially change the material of the component. In such cases, the material of the entire component has to be changed even though a part of the component will be damaged by high temperature. This may result in higher cost than necessary.

In one aspect of the present disclosure, it is preferable to effectively enhance the heat resistance of the exhaust pipe.

One aspect of the present disclosure is an exhaust pipe forming a flow path of exhaust gas of a vehicle, and the exhaust pipe includes a first end, a first flange portion, and a cover member. The first end includes a first opening. The first flange portion is formed on the first end. The cover member is provided to the first end. The first flange portion is configured to be fastened to a second flange portion formed on the second end of another exhaust pipe connected to the first end of the exhaust pipe. The cover member includes a held portion and an inner circumferential portion. The held portion is held between the first end and the second end when the second flange portion and the first flange portion are fastened together. The inner circumferential portion covers a region adjacent to the first opening in the inner circumferential surface of the exhaust pipe.

In the above-described configuration, the cover member can locally cover the region near the first opening in the inner circumferential surface of the exhaust pipe, thereby inhibiting the exhaust gas from directly blowing against the region. Thus, it is possible to protect the region that is liable to be damaged by heat from the exhaust gas without a change of a material of the first exhaust pipe to a material having higher heat resistance, and it is possible to avoid increases in sensitization and manufacturing costs caused by the change of the material. Therefore, the heat resistance of the exhaust pipe can be effectively enhanced.

One aspect of the present disclosure may further include a projection that is a portion formed on the first end so as to protrude along a central axis of the first opening, the portion being adjacent to the first opening and surrounding the first opening. The held portion may be held between a top surface on top of the projection and the second end. The cover member may further include an outer circumferential portion covering an outer circumferential surface of the projection.

In the above-described configuration, since the cover member can be provided to the first end by being fitted in the projection, thermal expansion of the cover member can be absorbed. This inhibits the inner circumferential portion of the cover member from separating from the inner circumferential surface of the exhaust pipe due to the thermal expansion, and the durability improves.

In one aspect of the present disclosure, the inner circumferential portion of the cover member may have a tip end on an end opposite the held portion, the tip end bending in a direction away from the inner circumferential surface of the exhaust pipe.

The above described configuration allows easy installation of the cover member to the first end of the exhaust pipe. In addition, an occurrence of damage to the cover member or the first end can be inhibited at the time of installing the cover member to the first end.

In one aspect of the present disclosure, the inner circumferential surface of the exhaust pipe may include at least one recess. The inner circumferential portion may include at least one protrusion that protrudes toward the inner circumferential surface of the exhaust pipe and that is configured to be engaged with the at least one recess formed on the inner circumferential surface.

In the above-described configuration, it is possible to inhibit the cover member provided to the first end from being out of position.

In one aspect of the present disclosure, the cover member may be a ring-shaped member and may be configured to be provided to the first end so as to circle around the first opening.

In the above-described configuration, the cover member can widely cover the region near the first opening in the inner circumferential surface of the exhaust pipe.

In one aspect of the present disclosure, the cover member may be a member curved into a ring shape extending from a third end to a fourth end, and the cover member may be configured to be provided to the first end so that the third end and the fourth end face each other with a clearance between the third end and the fourth end.

In the above-described configuration, a clearance is formed between the third end and the fourth end of the cover member provided to the first end, and therefore, the thermal expansion of the cover member can be absorbed by the clearance. This inhibits the cover member from separating from the inner circumferential surface of the exhaust pipe due to the thermal expansion, and the durability improves.

In one aspect of the present disclosure, the exhaust pipe may be configured to store a purification member to purify exhaust gas.

In the above-described configuration, it is possible to effectively enhance the heat resistance of the exhaust pipe storing a purification member of the exhaust gas.

In one aspect of the present disclosure, the exhaust pipe may be made of a material that is more heat-resistant than a material constituting the first end.

In the above-described configuration, the heat resistance of the exhaust pipe can be effectively enhanced.

In one aspect of the present disclosure, the first flange portion may be configured to be fastened to the second flange portion with a v-band clamp.

In the above-described configuration, the first and the second flange portions can be properly fastened.

BRIEF DESCRIPTION OF THE DRAWINGS

Some example embodiments of the present disclosure will be described hereinafter by way of example with reference to the accompanying drawings, in which.

DETAILED DESCRIPTION OF EXEMPLARY EMBODIMENTS

The present disclosure is not limited in any way to the following embodiments, and may take various forms as long as they fall within the technical scope of the present disclosure.

1. Configuration of First Exhaust Pipe

Figure 1:
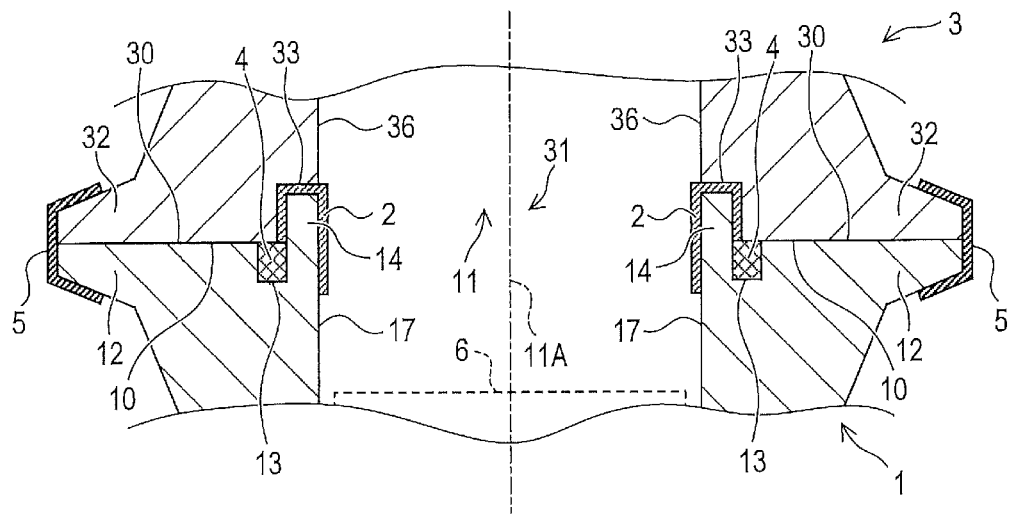
FIG. 1 is a sectional view along a central axis of a first exhaust pipe and a second exhaust pipe that are fastened together, showing a first end of the first exhaust pipe and a second end of the second exhaust pipe.
Figure 2:
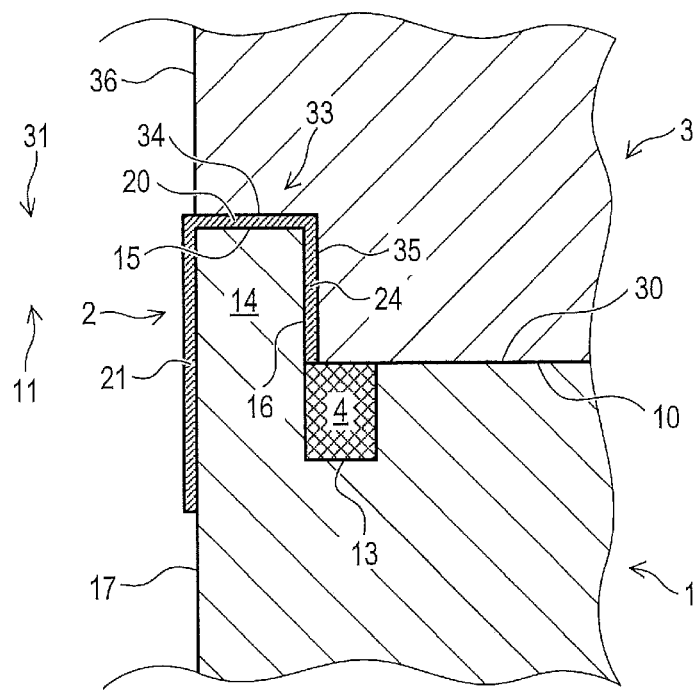
FIG. 2 is a sectional view perpendicular to a circumferential direction, showing a cover member provided to the first end of the first exhaust pipe.

A first exhaust pipe 1 of the present embodiment forms a flow path of exhaust gas from an engine of a vehicle (see FIGS. 1 and 2). Specifically, the first exhaust pipe 1 is fastened with a v-band clamp 5 on a downstream side of a second exhaust pipe 3 that discharges exhaust gas from a turbocharger. The first exhaust pipe 1 is configured to store a catalytic converter 6 (in other words, a purification member of the exhaust gas) to purify the exhaust gas.

The first and second exhaust pipes 1, 3 may be made of, for example, heat-resistant austenitic stainless steel. However, the first and the second exhaust pipes 1, 3 are not necessarily made of the austenitic stainless steel, and may be made of other heat-resistant steel materials. The second exhaust pipe 3 may be made of a material that is more heat-resistant than a material constituting the first end 1.

The first exhaust pipe 1 includes a first end 10, a first opening 11, a first flange portion 12, and a cover member 2.

The first opening 11 is a circular opening located in the first end 10 of the first exhaust pipe 1. The first opening 11 is located on an upstream side of the first exhaust pipe 1 in a flow direction of the exhaust gas and is connected to the second exhaust pipe 3. Note that the first opening 11 does not necessarily have a circular shape, and may have various shapes. Hereinafter, a straight line passing through the center of the first opening 11 and perpendicular to the first opening 11 is referred to as a central axis 11A.

The first flange portion 12 is formed on the first end 10 of the first exhaust pipe 1, and used for fastening to the second exhaust pipe 3.

The first end 10 surrounds the first opening 11 and has a flat surface extending in a direction perpendicular to the central axis 11A of the first opening 11. The first end 10 includes a groove 13 and a projection 14.

The projection 14 is a portion that protrudes from the first end 10 toward a second exhaust pipe 3 side along the central axis 11A, and that is adjacent to and surrounds the first opening 11. The projection 14 has a top surface 15 on the top thereof, and the top surface 15 has a flat surface extending in the direction perpendicular to the central axis 11A. The projection 14 has an inner circumferential surface that forms an inner circumferential surface 17 of the first exhaust pipe 1.

The groove 13 is a groove-shaped portion that is formed on the first end 10 and that surrounds the first opening 11. The groove 13 is formed so as to be adjacent to the outside of the projection 14. The projection 14 has an outer circumferential surface 16 that protrudes from a bottom surface of the groove 13 along the central axis 11A.

The cover member 2 is heat-resistant and provided to the first end 10. The detailed configuration of the cover member 2 will be described below.

2. Configuration of Second Exhaust Pipe

The second exhaust pipe 3 includes a second end 30, a second opening 31, and a second flange portion 32 (see FIGS. 1 and 2).

The second opening 31 is located in the second end 30 of the second exhaust pipe 3, and the exhaust gas from the turbocharger flows from the second opening 31. The second opening 31 is connected to the first opening 11 of the first exhaust pipe 1, and has a shape similar to that of the first opening 11 (for example, a circular shape).

The second flange portion 32 is formed on the second end 30 of the second exhaust pipe 3, and used for fastening to the first exhaust pipe 1.

The second end 30 surrounds the second opening 31, and has a flat surface extending in the direction perpendicular to the central axis 11A of the first opening 11 of the first exhaust pipe 1 connected to the second opening 31. The second end 30 includes a depression 33.

The depression 33 is formed on the second end 30 so as to be adjacent to the second opening 31 and to surround the second opening 31. The depression 33 has a bottom surface 34 and a first inner circumferential surface 35.

The bottom surface 34 is a flat portion extending in the direction perpendicular to the central axis 11A of the first opening 11 connected to the second opening 31. The bottom surface 34 is formed so as to circle around an inner circumferential surface of the second exhaust pipe 3. The bottom surface 34 forms a stepped portion on the inner circumferential surface of the second exhaust pipe 3 and partitions the inner circumferential surface into a first inner circumferential surface 35 and a second inner circumferential surface 36.

The first inner circumferential surface 35 is adjacent to the second opening 31 and surrounds the second opening 31. The first inner circumferential surface 35 is adjacent to the second inner circumferential surface 36 across the bottom surface 34, and the first inner circumferential surface 35 has a diameter larger than a diameter of the second inner circumferential surface 36.

3. Fastening of Exhaust Pipe

When the first opening 11 of the first exhaust pipe 1 is connected with the second opening 31 of the second exhaust pipe 3, the first flange portion 12 and the second flange portion 32 are fastened with the v-band clamp 5 (see FIG. 1). Note that the first and the second flange portions 12, 32 may be fastened with a member other than the v-band clamp 5.

When the first and the second flange portions 12, 32 are fastened, the projection 14 of the first end 10 of the first exhaust pipe 1 is fitted in the depression 33 of the second end 30 of the second exhaust pipe 3. That is, the projection 14 and the depression 33 are used for positioning when connecting the first exhaust pipe 1 and the second exhaust pipe 3.

When the projection 14 and the depression 33 are fitted, the top surface 15 of the projection 14 faces the bottom surface 34 of the depression 33, and the outer circumferential surface 16 of the projection 14 faces the first inner circumferential surface 35 of the depression 33. At this time, a portion radially outer side of the groove 13 of the first end 10 is in contact with the second end 30, and the inner circumferential surface 17 of the first exhaust pipe 1 and the second inner circumferential surface 36 of the second exhaust pipe 3 are flush. In order to seal a clearance between the first opening 11 and the second opening 31, a ring-shaped gasket 4 is arranged in the groove 13 of the first end 10.

4. Cover Member

Figure 3:
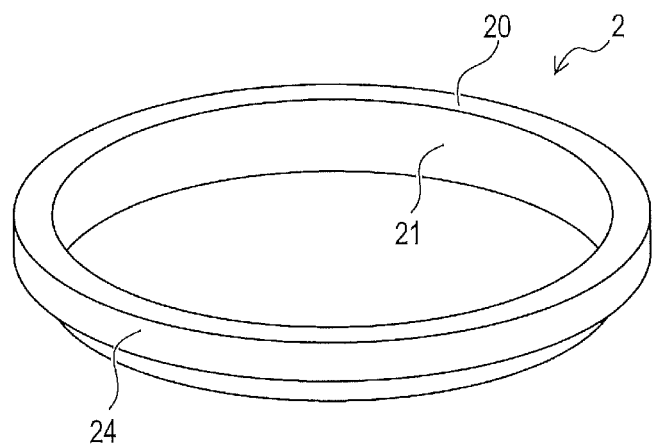
FIG. 3 is a perspective view of the cover member.

The above-described cover member 2 is held between the first end 10 of the first exhaust pipe 1 and the second end 30 of the second exhaust pipe 3, which are fastened together (see FIGS. 1 and 2). The cover member 2 is a ring-shaped member and is attached to the projection 14 of the first end 10 so as to circle around the first opening 11 (see FIG. 3). Note that the ring-shaped cover member 2 may be made of, for example, an elongated plate-shaped member whose both ends are joined to form a circle.

The cover member 2 is made of a material that is more heat-resistant than the material constituting the first end 10 of the first exhaust pipe 1. Specifically, the cover member 2 may be made of ferritic stainless steel, for example. It is needless to say that the cover member 2 may be made of other materials. The heat resistance of the material constituting the cover member 2 may be equal to that of the material constituting the first end 10 and the like of the first exhaust pipe 1, and may be lower than that of the material.

The cover member 2 includes a held portion 20, an inner circumferential portion 21, and an outer circumferential portion 24.

The held portion 20 is a ring-shaped portion extending in a radial direction of the cover member 2.

The inner circumferential portion 21 is a wall-shaped portion protruding from an inner circumference edge of the held portion 20, and is provided so as to circle around the edge.

The outer circumferential portion 24 is a wall-shaped portion protruding from an outer circumference edge of the held portion 20 in the same direction as the inner circumferential portion 21, and is provided so as to circle around the edge.

That is, the cover member 2 is a groove-shaped member with the held portion 20 at the bottom, and is formed to be fitted in the projection 14. The cover member 2 is configured to be press-fitted to the projection 14 when fitted in the projection 14. In the present embodiment, the cover member 2 and the projection 14 are not welded together. However, the configuration is not limited to this, and the cover member 2 may be welded to the projection 14.

When the cover member 2 is fitted in the projection 14, the held portion 20 covers the top surface 15 of the projection 14, and the outer circumferential portion 24 covers the outer circumferential surface 16 of the projection 14. At this time, the inner circumferential portion 21 covers a region adjacent to the first opening 11 in the inner circumferential surface 17 of the first exhaust pipe 1. In this embodiment, as an example, the inner circumferential portion 21 entirely covers a region of the inner circumferential surface 17 corresponding to the projection 14. However, the inner circumferential portion 21 may partially cover the region, or may cover both of the region and an area further downstream side of the region of the inner circumferential surface 17. At this time, the inner circumferential portion 21 may be in contact with the inner circumferential surface 17, or may have a small clearance between the inner circumferential portion 21 and the inner circumferential surface 17.

When the first and the second flange portions 12, 32 are fastened, the held portion 20 is held between the top surface 15 and the bottom surface 34 of the depression 33 of the second end 30, and the outer circumferential portion 24 is held between the outer circumferential surface 16 of the projection 14 and the first inner circumferential surface 35 of the depression 33.

5. Effects (1) In the above-described embodiment, the cover member 2 locally covers the region near the first opening 11 (hereinafter, referred to as a covered region) in the inner circumferential surface 17 of the first exhaust pipe 1, thereby inhibiting the exhaust gas from directly blowing against the covered region. Thus, it is possible to protect a region that is liable to be damaged by heat from the exhaust gas without changing the material constituting the entire part of the first exhaust pipe 1 to a material having higher heat resistance.

This eliminates the need to change the material of the first exhaust pipe 1 to a material having a high carbon content, which may cause sensitization, or to a material that may cause difficulty in shape-processing or welding in order to improve heat resistance. As a result, it is possible to avoid a decrease in corrosion resistance or an increase in manufacturing costs caused by the change of the material.

Especially when the v-band clamp 5 is used for fastening the members as in the above embodiment, the first and the second flanges 12, 32 need to be formed into special shapes, and a shape-processing method of the first and the second exhaust pipes 1, 3 is limited. In addition, the first exhaust pipe 1 storing the catalytic converter 6 is large, and it may be difficult that only a part of the first exhaust pipe 1 is made of a different material. Thus, if the material of the first exhaust pipe 1 is changed to a material having high heat resistance, the material of the entire first exhaust pipe 1 has to be changed, leading to a possible increase in manufacturing costs.

In contrast, in the above-described embodiment, the covered region of the first exhaust pipe 1 can be locally protected without changing the material of the first exhaust pipe 1. Thus, the heat resistance of the first exhaust pipe 1 can be effectively enhanced, and as a result, the durability of the first exhaust pipe 1 improves.

(2) It is also conceivable to locally protect the first exhaust pipe 1 by applying a heat resistant coating material to the covered region of the inner circumferential surface 17. However, if such a method is used, the coating material adhered to the covered region may be peeled off due to a thermal expansion difference between the first exhaust pipe 1 and the coating material, and the covered region may be exposed.

In contrast, in the above-described embodiment, the cover member 2 is not adhered to the covered region unlike the coating material, and the influence of the thermal expansion difference between the cover member 2 and the first exhaust pipe 1 can be inhibited. Thus, the cover member 2 is less likely to separate from the inner circumferential surface 17 in comparison with a case where the coating material is applied.

In the manufacturing of a component (hereinafter, referred to as a target component) including the first and the second exhaust pipes 1, 3, the process of applying the coating material to the covered region may increase the burden on the environment in comparison with the process of attaching the cover member 2 to the projection 14.

When the coating material is applied to the covered region at a stage before the fastening of the first end 10 of the first exhaust pipe 1 and the second end 30 of the second exhaust pipe 3, the applied coating material might be peeled off at the time of the fastening. When the coating material is applied to the covered region after the fastening of the first end 10 and the second end 30, the coating material might be attached to other portions of the first and the second exhaust pipes 1, 3. Thus, in the case of applying the coating material to the covered region, the manufacturing of the target component becomes difficult.

In addition, in the case of applying the coating material to the covered region, in order to confirm the protection quality of the covered region, it is necessary to measure, for example, a film thickness of the applied coating material or the fixing strength between the coating material and the covered region. In order to perform such measurements, it is necessary to disassemble the produced target component. On the other hand, in the case of using the cover member 2, the protection quality of the covered region can be confirmed based on the accuracy of the dimensions of the cover member 2 and the projection 14, or a state of the cover member 2 attached to the projection 14. Thus, the quality control is easy compared to the case of applying the coating material to the covered region.

(3) The cover member 2 has a ring groove shape, and press-fitted to the projection 14. Thus, the thermal expansion of the cover member 2 can be absorbed. This inhibits the inner circumferential portion 21 of the cover member 2 from separating from the inner circumferential surface 17 of the first exhaust pipe 1 due to the thermal expansion, and the durability improves.

6. Modified Examples of Cover Member (1) Modified Example 1

Figure 4:
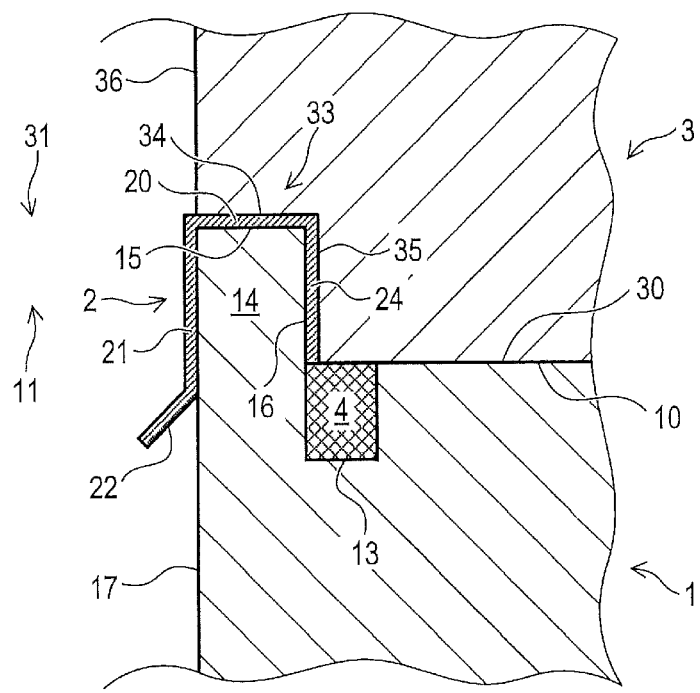
FIG. 4 is a sectional view perpendicular to the circumferential direction, showing a cover member of a modified example 1 provided to the first end of the first exhaust pipe.

The inner circumferential portion 21 of the cover member 2 may have a tip end 22 on an end opposite the held portion 20, and the tip end 22 is bent to a direction away from the inner circumferential surface 17 of the first exhaust pipe 1 (see FIG. 4). The tip end 22 is provided around the entire circumference of the end of the inner circumferential portion 21. A distance between the tip end 22 and the outer circumferential portion 24 increases with distance from the held portion 20. For example, the tip end 22 may be bent straight or curved in a cross section perpendicular to a circumferential direction of the cover member 2.

In the modified example 1, the cover member 2 is easily attached to the projection 14 of the first end 10 of the first exhaust pipe 1. In addition, the occurrence of damage to the cover member 2 or the first end 10 can be inhibited at the time of attaching the cover member 2 to the projection 14, resulting in improvement in quality.

(2) Modified Example 2

Figure 5:
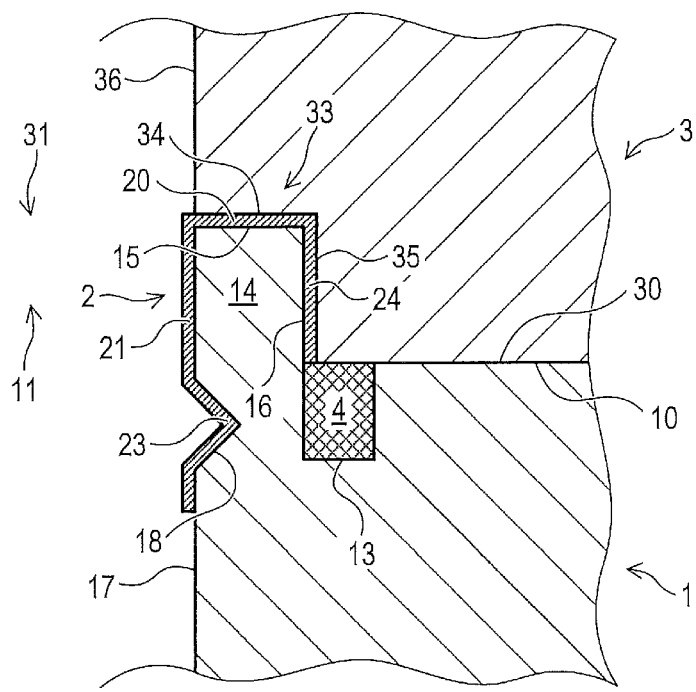
FIG. 5 is a sectional view perpendicular to the circumferential direction, showing a cover member of a modified example 2 provided to the first end of the first exhaust pipe.

The inner circumferential surface 17 of the first exhaust pipe 1 may have a recess 18 in the covered region covered by the inner circumferential portion 21 of the cover member 2 (see FIG. 5). The inner circumferential portion 21 may have a protrusion 23 that protrudes toward the inner circumferential surface 17 and that is configured to be engaged with the recess 18 of the inner circumferential surface 17. When the cover member 2 is fitted in the projection 14 of the first end 10, the protrusion 23 may be engaged with the recess 18.

One recess 18 and one protrusion 23 may be formed. In this case, the recess 18 and the protrusion 23 may be provided so as to each circle around the inner circumferential surface 17. Alternatively, two or more recesses 18 and two or more protrusions 23 may be formed. In this case, the two or more recesses 18 may be arranged side by side and the two or more protrusions 23 may be arranged side by side so as to circle around the inner circumferential surface 17.

In the modified example 2, it is possible to inhibit the cover member provided to the projection 14 of the first end 10 from being out of position.

Likewise, also in the modified example 1, the inner circumferential portion 21 may include at least one protrusion 23 and the inner circumferential surface 17 may include at least one recess 18.

(3) Modified Example 3

Figure 6:
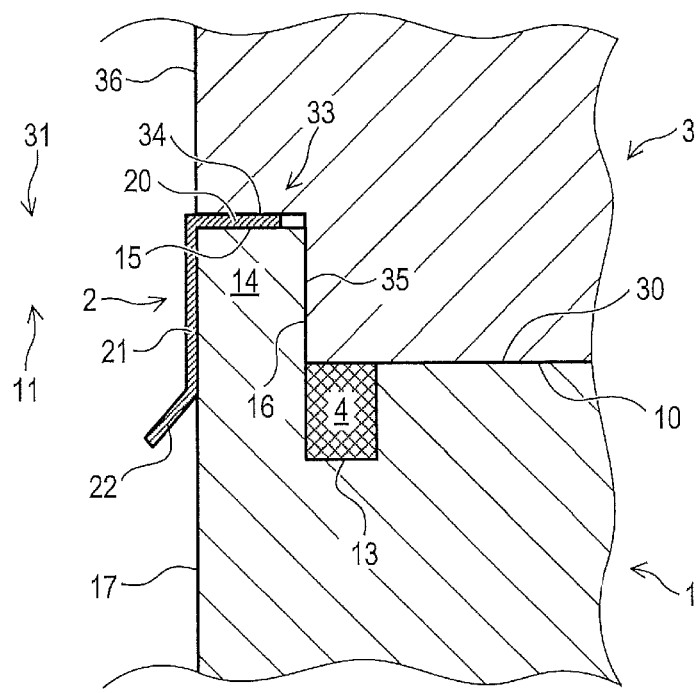
FIG. 6 is a sectional view perpendicular to the circumferential direction, showing a cover member of a modified example 3 provided to the first end of the first exhaust pipe.
Figure 7:
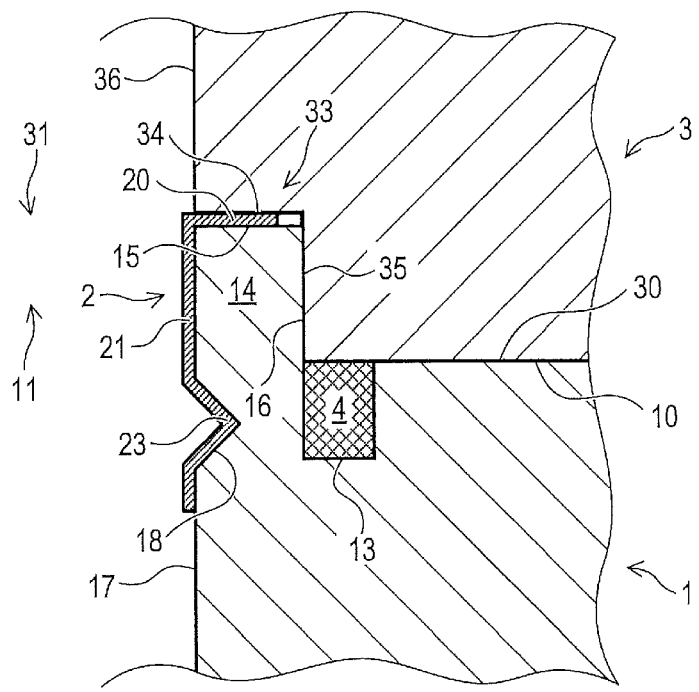
FIG. 7 is a sectional view perpendicular to the circumferential direction, showing a cover member of a modified example 4 provided to the first end of the first exhaust pipe.

The cover member 2 may have a configuration in which the outer circumferential portion 24 is not formed (see FIGS. 6 and 7). That is, the cover member 2 may have an L-shape in a cross section perpendicular to the circumferential direction thereof. Also in this case, the tip end 22 may be formed in the inner circumferential portion 21 of the cover member 2 as in the case of the modified example 1. As in the case of the modified example 2, at least one recess 18 may be formed in the covered region of the inner circumferential surface 17 of the first exhaust pipe 1, and at least one protrusion 23 may be formed in the inner circumferential portion 21. Furthermore, as in the case of the modified examples 1, 2, the tip end 22 and at least one protrusion 23 may be formed in the inner circumferential portion 21.

In the modified example 3, since the outer circumferential portion 24 is not formed, the held portion 20 of the cover member 2 can be thermally expanded outward (i.e. toward a first inner circumferential surface 35 side) under high temperature. This inhibits the inner circumferential portion 21 from separating from the inner circumferential surface 17 due to the thermal expansion of the held portion 20, and the durability thereby improves.

(4) Modified Example 4

Figure 8:
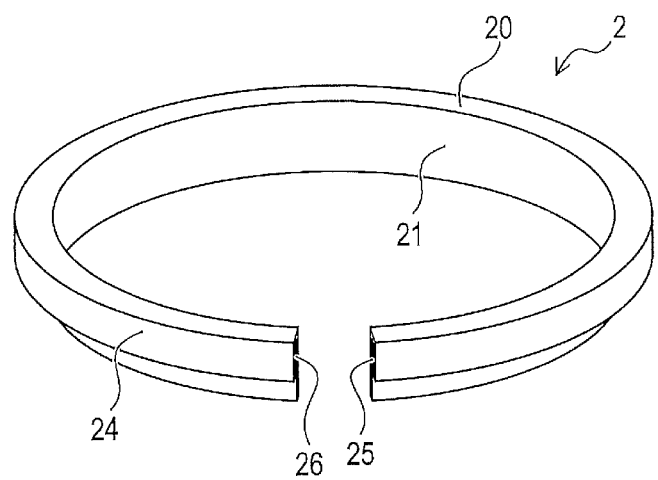
FIG. 8 is a perspective view of a cover member of a modified example 5.

The cover member 2 may be formed as a member curved into a ring shape extending from a third end 25 to a fourth end 26 (see FIG. 8). The third end 25 and the fourth end 26 may face each other with a clearance between them when the cover member 2 is attached to the projection 14 of the first end 10. In other words, the cover member 2 of the modified example 4 has a C-shape.

In the modified example 4, the cover member 2 is easily attached to the projection 14 compared to the case where the cover member 2 has a ring shape without the third and the fourth ends 25, 26. In addition, with the clearance between the third end 25 and the fourth end 26 of the cover member 2 attached to the projection 14, the thermal expansion of the cover member 2 can be absorbed. This inhibits the inner circumferential portion 21 of the cover member 2 from separating from the inner circumferential surface 17 due to the thermal expansion, and the durability improves.

Since the cover member 2 of the modified example 4 has a configuration of having the third and the fourth ends 25, 26, the cover member 2 can be relatively easily manufactured without requiring welding. Therefore, the manufacturing cost of the cover member 2 can be reduced, and the occurrence of the thermal stress in the cover member 2 can be inhibited, and the durability of the cover member 2 can be improved.

(5) Modified Example 5

The cover member 2 is not necessarily a ring-shaped member, and may be configured as an arc-shaped member. The cover member 2 may cover a part that is liable to be damaged by heat from the exhaust gas in a region adjacent to the first opening 11 in the inner circumferential surface 17 of the first exhaust pipe 1. Even if such a configuration is adopted, the heat resistance of the first exhaust pipe 1 can be effectively enhanced.

7. Other Embodiments (1) In the above-described embodiment, the projection 14 is formed on the first end 10 of the first exhaust pipe 1, and the depression 33 is formed on the second end 30 of the second exhaust pipe 3, and the cover member 2 is attached to the projection 14. However, the configuration is not limited to this, and the depression 33 may be formed on the first end 10, and the projection 14 may be formed on the second end 30, and the cover member 2 may be attached to the projection 14 of the second end 30. The cover member 2 may cover the inner circumferential surface of the second exhaust pipe 3. Even if such a configuration is adopted, a similar effect can be obtained.

(2) In the above-described embodiment, the cover member 2 is provided to the first end 10 that is located on the downstream side of the turbocharger and that is located on the upstream side of the first exhaust pipe 1 storing the catalytic converter 6. However, the configuration is not limited to this. For example, an end on a downstream side of the first exhaust pipe 1 or an end of another exhaust pipe installed in a vehicle, and end of an exhaust pipe connected to such end may be configured similarly to the first and the second ends 10, 30. And the cover members 2 may be provided to these connected ends similarly to the above-described embodiments. Even if such a configuration is adopted, a similar effect can be obtained.

(3) In the above-described embodiment, the top surface 15 of the projection 14 is located closer to the second exhaust pipe 3 than the first end 10. However, the top surface 15 may be located so as to be flush with the first end 10, and may be located on a first exhaust pipe 1 side than the first end 10. The groove 13 is not necessarily provided to the first end 10 of the first exhaust pipe 1. Even if such a configuration is adopted, the cover member 2 can be attached to the projection 14 similarly to the above-described embodiments.

In addition, a configuration may be adopted in which the first end 10 does not include the projection 14 and the groove 13, and the second end 30 of the second exhaust pipe 3 does not include the depression 33. Even if such a configuration is adopted, a cover member 2 having an L-shape in the cross section perpendicular to the circumferential direction thereof may be formed, thereby the cover member 2 can be attached to the first end 10.

(4) A plurality of functions of one element of the aforementioned embodiments may be performed by a plurality of elements, and one function of one element may be performed by a plurality of elements. Further, a plurality of functions of a plurality of elements may be performed by one element, and one function performed by a plurality of elements may be performed by one element. Furthermore, a part of the configurations of the aforementioned embodiments may be omitted. At least part of the configurations of the aforementioned embodiments may be added to or replaced with the configurations of the other above-described embodiments.

8. Correspondence Between Terms

The second exhaust pipe 3 of the above-described embodiment corresponds to an example of another exhaust pipe.

What is claimed is:
1. An exhaust pipe forming a flow path of exhaust gas of a vehicle, the exhaust pipe comprising:
   a first end including a first opening;
   a first flange portion formed on the first end; and
   a cover member arranged at the first end,
   wherein the first flange portion is configured to be fastened to a second flange portion formed on a second end of another exhaust pipe connected to the first end of the exhaust pipe, and
   wherein the cover member includes
   a held portion configured to be held between the first end and the second end when the first flange portion and the second flange portion are fastened together, and
   an inner circumferential portion covering a region adjacent to the first opening in an inner circumferential surface of the exhaust pipe, and
   wherein the inner circumferential portion of the cover member has a tip end on an end opposite the held portion, the tip end bending in a direction away from the inner circumferential surface of the exhaust pipe.
2. The exhaust pipe according to claim 1, further comprising a projection formed on the first end so as to protrude along a central axis of the first opening, the projection being adjacent to the first opening and surrounding the first opening,
  wherein the held portion is configured to be held between a top surface on top of the projection and the second end, and
  wherein the cover member further includes an outer circumferential portion covering an outer circumferential surface of the projection.

3. The exhaust pipe according to claim 1,
  wherein the cover member is a ring-shaped member and is arranged to encircle the first opening.

4. The exhaust pipe according to claim 1,
  wherein the exhaust pipe is configured to store a purification member to purify exhaust gas.

5. The exhaust pipe according to claim 1,
  wherein the cover member is made of a material that is more heat-resistant than a material constituting the first end.

6. The exhaust pipe according to claim 1,
  wherein the first flange portion is configured to be fastened to the second flange portion with a v-band clamp.

7. An exhaust pipe forming a flow path of exhaust gas of a vehicle, the exhaust pipe comprising:
  a first end including a first opening;
  a first flange portion formed on the first end; and
  a cover member arranged at the first end,
  wherein the first flange portion is configured to be fastened to a second flange portion formed on a second end of another exhaust pipe connected to the first end of the exhaust pipe, and
  wherein the cover member includes
    a held portion configured to be held between the first end and the second end when the first flange portion and the second flange portion are fastened together, and
    an inner circumferential portion covering a region adjacent to the first opening in an inner circumferential surface of the exhaust pipe,
  wherein the inner circumferential surface of the exhaust pipe includes at least one recess, and
  wherein the inner circumferential portion includes at least one protrusion that protrudes toward the inner circumferential surface of the exhaust pipe and that is configured to be engaged with the at least one recess formed in the inner circumferential surface.

8. The exhaust pipe according to claim 7,
  wherein the cover member is a ring-shaped member and is arranged to encircle the first opening.

9. The exhaust pipe according to claim 7,
  wherein the exhaust pipe is configured to store a purification member to purify exhaust gas.

10. The exhaust pipe according to claim 5,
  wherein the cover member is made of a material that is more heat-resistant than a material constituting the first end.

11. The exhaust pipe according to claim 5, wherein the first flange portion is configured to be fastened to the second flange portion with a v-band clamp.

12. The exhaust pipe according to claim 7, further comprising a projection formed on the first end so as to protrude along a central axis of the first opening, the projection being adjacent to the first opening and surrounding the first opening,
  wherein the held portion is configured to be held between a top surface on top of the projection and the second end, and
  wherein the cover member further includes an outer circumferential portion covering an outer circumferential surface of the projection.

13. An exhaust pipe forming a flow path of exhaust gas of a vehicle, the exhaust pipe comprising:
  a first end including a first opening;
  a first flange portion formed on the first end; and
  a cover member arranged at the first end,
  wherein the first flange portion is configured to be fastened to a second flange portion formed on a second end of another exhaust pipe connected to the first end of the exhaust pipe, and
  wherein the cover member includes
    a held portion configured to be held between the first end and the second end when the first flange portion and the second flange portion are fastened together, and
    an inner circumferential portion covering a region adjacent to the first opening in an inner circumferential surface of the exhaust pipe,
  wherein the cover member is a member having a third end and a fourth end, and is curved into a ring shape extending from the third end to the fourth end, and
  wherein the cover member is configured to be arranged at the first end so that the third end and the fourth end face each other with a clearance between the third end and the fourth end.

14. The exhaust pipe according to claim 13, further comprising a projection formed on the first end so as to protrude along a central axis of the first opening, the projection being adjacent to the first opening and surrounding the first opening,
  wherein the held portion is configured to be held between a top surface on top of the projection and the second end, and
  wherein the cover member further includes an outer circumferential portion covering an outer circumferential surface of the projection.

15. The exhaust pipe according to claim 13,
  wherein the cover member is arranged to encircle the first opening.

16. The exhaust pipe according to claim 13,
  wherein the exhaust pipe is configured to store a purification member to purify exhaust gas.

17. The exhaust pipe according to claim 13,
  wherein the cover member is made of a material that is more heat-resistant than a material constituting the first end.

18. The exhaust pipe according to claim 13,
  wherein the first flange portion is configured to be fastened to the second flange portion with a v-band clamp.

* * * * *